June 9, 1942.   A. V. CASELLI ET AL   2,285,898
PROCESS FOR EXTRACTION
Filed June 22, 1940
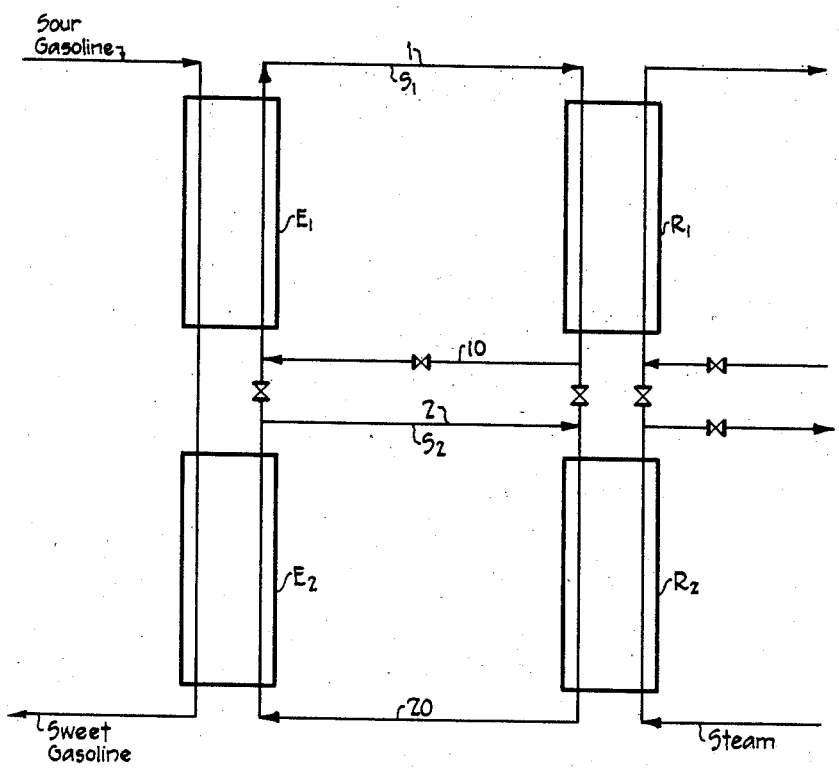
Inventors: Albert V. Caselli
Alan C. Nixon
By their Attorney:

Patented June 9, 1942

2,285,898

UNITED STATES PATENT OFFICE 2,285,898

PROCESS FOR EXTRACTION

Albert V. Caselli, Oakland, and Alan C. Nixon, Berkeley, Calif., assignors to Shell Development Company, San Francisco, Calif., a corporation of Delaware Application June 22, 1940, Serial No. 341,892

8 Claims. (Cl. 196—32)

This invention relates to extraction processes, and more particularly deals with a process wherein a solute comprising a mixture of various components is transferred from a first liquid solvent to a second solvent by means of one or several intermediate solvents, which are substantially immiscible with the other two solvents, and wherein the different components in said mixture differ in their extraction coefficients or distribution constants between the first and intermediate solvents.

The process is particularly applicable to, though not necessarily limited to, regenerative processes in which impurities contained in a liquid solution are extracted from the solution by means of a suitable lean solvent to result in a fat solvent which is then regenerated by stripping with a suitable stripping medium, liquid or gaseous, and the regenerated lean solution is then returned to the extraction zone further to extract impurities. For example, the process is extremely useful in the separation of mercaptans from hydrocarbon oils by the so-called solutizer process described by Yabroff and Border in the paper presented to A. P. I. May, 1939, see Refiner, vol. 18, May 1939, page 171; or in the removal of nitrogen bases from petroleum or other oils by extraction with aqueous solutions of acids having dissociation constants below about $10^{-3}$; or in the removal of fatty acids from fatty oils with organic bases; or in the recovery of diolefines from hydrocarbon mixtures with aqueous solution of cuprous chloride, etc.

It is a purpose of this invention to so conduct the flow of the several solvents to improve the overall efficiency of the transfer; or in a regenerative process to reduce to a minimum the amount of stripping medium required effectively to remove the impurities from their original solution.

In the following description, the terms "extraction coefficient" and "extraction factor" will be used, respectively. Extraction coefficient, also known as distribution constant, is the concentration of the solute in the extracting phase divided by the concentration by the same solute in the extracted phase under equilibrium conditions. More specifically, to avoid confusion, we limit in the following description the term "extraction coefficient of a component" to the distribution constant of said component between the first solvent originally containing said component and the intermediate solvent used to extract it therefrom by direct contact. The extraction factor is a measure for the extent of the extraction of the solute by the extraction phase, and is the product of the extraction coefficient times the volume ratio of extracting to extracted liquids.

In the conventional countercurrent extraction of a mixture of components of different coefficients of extraction, an excess of solvent is normally required over that necessary for the removal of the easily extracted components, in order to have enough solvent present for the removal of the more difficultly extractable components. The resulting fat solution of the extracting solvent is therefore relatively dilute with respect to the easily extractable components. As is known, the regeneration of a fat solution with the aid of a convection medium is essentially a reversal of the extraction, and the easily extractable components are more difficult to strip out from the fat solution than the more difficultly extractable ones. It follows that in the regeneration of a "dilute fat solution," an amount of convection medium greater than the minimum is required, which minimum would be necessary, had the easily extractable components been extracted with a minimum instead of an excess of solvent. Therefore, conventional countercurrent extraction of a mixed solute and regeneration of the resulting fat solution violates the principle that maximum economy of transfer of a component from one phase to another by means of an intermediate solvent is obtained when a minimum volume of the intermediate solvent is used.

Ideally then, maximum economy is effected by extracting each component of the mixed solute with just the minimum amount of solvent required for that component. Our system is designed to meet or at least approach this ideal situation by allowing two or more components or groups of components of different extraction coefficients each to be extracted with the minimum amount of solvent. This may be accomplished by subjecting the original solution of transferable components to two or more successive extractions at progressively increasing extraction factors, and separately regenerating the several fat solutions so obtained. Preferably, the regeneration is effected by passing the same convection medium successively through the several fat solutions in the order of decreasing extraction coefficients of the components which they contain.

Differences in extraction factors may be brought about in one of two ways: (1) By using the same solvent in the several extraction sections of an extraction system, in each subsequent section a larger amount of solvent being circulated than in the preceding section. (2) By using different solvents in the several extraction sections, the solvent powers of the solvents for the extractable components being progressively greater in subsequent sections, and if required, also circulating different volumes through the several sections.

In this manner, the bulk of the more readily extractable components is removed in the early sections under conditions such that little removal of the more difficulty extractable components occurs. In the subsequent sections, at greater extraction factors, the extraction is completed. The desired amount of extraction is thus obtained without producing the widespread dilution effect of the easily extractable components which takes place in the conventional countercurrent extraction, as explained before, and it has been found that the amount of convection medium required for regeneration is greatly decreased by my improvement.

Our invention is most readily understood by reference to the accompanying drawing which comprises a simplified flow diagram of my process. For the sake of simplicity, only two sections or stages are shown, and in order further to simplify the explanation, a specific application of the process is illustrated, namely, the sweetening of sour gasoline in the hereinbefore-mentioned solutizer process. This process involves the extraction of mercaptans from sour gasoline distillates by means of aqueous solutions of an alkali metal hydroxide containing a solutizer or solubility promoter for the mercaptans, such as is described in Patents 2,152,220, 2,152,-723, 2,152,166, 2,183,801, 2,168,078, 2,149,379, 2,149,380, 2,156,577, 2,152,722, 2,164,851, 2,152,724, etc. The resulting foul solution is regenerated by steam stripping.

Referring to the drawing, sour gasoline which has been freed from relatively strong acids, such as naphthenic acids, fatty acids, etc., incapable of being removed by steam stripping from an aqueous solution of an alkali metal hydroxide, passes in series through two extractors, E—1 and E—2. Opposite these extractors are shown two regenerators or strippers R—1 and R—2. A first solvent S—1, comprising an aqueous solution of an alkali metal hydroxide, circulates from E—1 through line 1, stripper R—1 and line 10 back to E—1. A second solvent S—2 for mercaptans which is a solutizer solution circulates likewise from extractor E—2 through line 2, stripper R—2 and line 20 back to E—2. Amounts and solvent power of solvent S—1 are so chosen that a portion only of the mercaptans are extracted from the gasoline. Solvent S—2, being an aqueous solution of alkali metal hydroxide containing a solutizer, normally has a solvent power for mercaptans equal to or greater than that of solvent S—1, and its amount is such that the residual mercaptans in the gasoline entering extractor E—2 are removed, resulting in a sweet gasoline. The resulting spent solvents S—1 and S—2, emerging from extractors E—1 and E—2, are then regenerated in the steam strippers R—1 and R—2, respectively, through which they pass and wherein they are contacted with stripping steam. If desired, fresh steam may be introduced into each stripper. We prefer, however, to admit fresh steam to stripper R—2 only, and to pass the resulting spent steam through stripper R—1 without introducing into the latter fresh steam. In this manner, a large saving of stripping steam can be achieved because the amount of steam required in that case for stripping both spent solutions S—1 and S—2 successively is not substantially greater than the larger of the two amounts required separately to strip the two solutions each with fresh steam. Since solvent S—1 has a lower solvent power than S—2, mercaptans picked up by the steam in the stripper R—2 will not be absorbed by S—1 in stripper R—1.

If solvents S—1 and S—2 have the same or substantially the same solvent power for mercaptans, then it is necessary that the volume of S—1 be smaller than that of S—2 in order to maintain the requirement earlier stated that the extraction factors in subsequent extractor sections be increased. This can be achieved by closing line 10 and instead flowing solvent S—1 from R—1 into R—2, where it joins solvent S—2. The combined solvent then passes through R—2, line 20 and extractor E—2. After leaving E—2, the combined solvent is divided, a portion proceeding through extractor E—1, line 1 and stripper R—1, while the remainder returns directly to R—2.

In the foregoing, we have described the drawing by referring to the particular process of removing mercaptans from hydrocarbon oils by means of an aqueous solution containing a caustic alkali and a solutizer, and regenerating the resulting foul aqueous solution by steam stripping. It is, of course, understood that the principles described in the figures are applicable as well to other processes, particularly to those listed earlier, and it is equally understood that the regeneration need not be achieved by steam stripping. For example, other gaseous convection or stripping media inert under the conditions of stripping may be employed, such as air, nitrogen, hydrogen, $CO_2$, flue gases, etc., and it will be obvious to those skilled in the art which of these media are applicable in different processes and which are not. Or we may use a liquid convection medium instead of a gaseous one. For example, we may strip mercaptans from the circulating solvent or solvents by contacting them with a good solvent for mercaptans, which itself is substantially insoluble in the circulating solvents and which can be separated from the mercaptans by simple means, e. g., fractional distillation. For example, certain ethers, as diisopropyl ether, dibutyl ether, etc., may be used; or aromatic hydrocarbon solvents as benzene, toluene, xylene, etc.; low boiling petroleum fractions as various gasoline distillates, naphtha, pentane, hexane, cyclohexane, etc.; chlorinated hydrocarbons, as carbon tetrachloride, chlorpropane, ethylene dichlor, tetrachlorethane, etc.; nitrogen bases, etc. The principle of stripping with a convection medium which is liquid instead of gaseous is, of course, equally applicable to other processes, such as those described earlier.

The solvent powers of the solvents for the transferable materials can be changed in several ways. One may, for example, select two solvents of different chemical compositions which differ from each other in their internal pressures. In cases where the solvents are aqueous solutions, as in the extraction of mercaptans, nitrogen bases, aldehydes, etc., differences in solvent powers may be achieved by changing the concentration of the active component. Thus, for example, in the removal of mercaptans by the solutizer process, we may extract first with a solution of an alkali metal hydroxide containing a relatively small amount of a solutizer or none at all, and thereafter with a more concentrated alkali metal hydroxide solution which may contain a larger amount of solutizer and which, if desired, may comprise a more active alkali metal hydroxide or solutizer or both than the first solution.

Variations in solvent power may also be effected by differences in the temperatures maintained during extraction, extraction efficiency in general increasing with the lowering of the temperature. Thus the second extractor may be operated at a lower temperature than the first one. However, in general, it is preferable to maintain the lowest practicable temperature in both the first and the second extractors, which means that usually substantially the same temperature is maintained in both extraction stages.

Our invention is further illustrated by the following example:

Example

When extracting mercaptans from a sour gasoline containing .3% n-propyl mercaptan sulfur and .2% tertiary amyl mercaptan sulfur, with an aqueous solution of 6 normal KOH and 3 normal potassium isobutyrate in a six-stage countercurrent extractor to produce a sweetened gasoline, and regenerating the resulting foul aqueous solution by steam stripping in a ten-stage countercurrent stripper, the minimum total amount of steam required for sweetening is 29.0 pounds of steam per barrel of gasoline sweetened.

When modifying the above conventional extraction according to this invention, i. e., when extracting the sour gasoline in 3 of the 6 stages with an 18% aqueous solution of NaOH, and steam stripping the resulting first foul solution in 5 of the 10 stripping stages; extracting the resulting partially extracted gasoline in the remaining 3 extraction stages with an aqueous solution of 6 normal KOH and 3 normal potassium isobutyrate to produce a sweetened gasoline, and regenerating the resulting second foul solution by steam stripping in the remaining 5 stripping stages, the steam from the second regeneration being used in the first regeneration; then the total amount of steam required in the sweetening can be reduced to 23.2 pounds per barrel of sweetened gasoline. In other words, a saving of around 20% of the total steam requirement is achieved over that required in conventional extraction and regeneration operation.

We claim as our invention:

1. In a regenerative process for extracting a single liquid containing components of different degrees of ease of extraction with at least one substantially immiscible solvent for said components in at least two extraction zones to produce a treated liquid and fat solvent, and wherein fat solvent is regenerated by stripping with a convection medium to produce lean solvent which is returned to said zones to further contact said liquid, the improvement comprising contacting said liquid in a first extraction zone with solvent to remove components relatively easy to extract whereby is produced a first fat solvent, extracting the resulting liquid in a second extraction zone with solvent to remove components relatively difficult to extract whereby is produced a second fat solvent, regenerating said fat solvents by contacting said second fat solvent with a convection medium and subsequently contacting said first fat solvent with said same convection medium.

2. In a regenerative process for extracting a single liquid containing components of different degrees of ease of extraction with a single substantially immiscible solvent for said components in at least two extraction zones to produce a treated liquid and fat solvent and whereby fat solvent is regenerated by stripping with a convection medium to produce lean solvent which is returned to said zones to further contact said liquid, the improvement comprising contacting said liquid in a first extraction zone with a first portion of said solvent to remove components relatively easy to extract, whereby is produced a first fat solvent, extracting the resulting liquid in a second extraction zone with a second larger portion of said solvent to remove components relatively difficult to extract whereby is produced a second fat solvent, regenerating said fat solvents by contacting said second fat solvent with a convection medium and subsequently contacting said first fat solvent with said same convection medium.

3. In a regenerative process for extracting a single liquid containing components of different degrees of ease of extraction with at least two substantially immiscible solvents for said components in at least two extraction zones to produce a treated liquid and fat solvent and wherein fat solvent is regenerated by stripping with a convection medium to produce lean solvent which is returned to said zones to further contact said liquid, the improvement comprising contacting said liquid in a first extraction zone with a first solvent to remove components relatively easy to extract whereby is produced a first fat solvent, extracting the resulting liquid in a second extraction zone with a second solvent to remove components relatively difficult to extract whereby is produced a second fat solvent, regenerating said fat solvents by contacting said second fat solvent with a convection medium and subsequently contacting said first fat solvent with said same convection medium.

4. In a regenerative process for extracting a single liquid containing components of different degrees of ease of extraction with a substantially immiscible solvent for said components in two extraction zones to produce treated liquid and fat solvent and wherein fat solvent is regenerated by stripping with a convection medium to produce lean solvent which is returned to said zones to further contact said liquid, the improvement comprising flowing said liquid countercurrently to a first solvent in a first extraction zone to produce a first fat solvent and a partially treated liquid, flowing said partially treated liquid countercurrently to a second solvent in a second extraction zone to produce a treated liquid and a second fat solvent, dividing said second fat solvent into two portions, a first portion which constitutes said first solvent and a second portion which is contacted with a first convection medium in a first stripping zone to produce a partially spent convection medium, flowing said partially spent convection medium countercurrently to said first fat solvent in a second stripping zone to produce a partially lean solvent, combining the latter with said second portion of said second fat solvent and flowing the resulting mixture countercurrently to said first convection medium in said first stripping zone to produce said second solvent.

5. In a regenerative process wherein mercaptans are extracted from a sour hydrocarbon oil with an aqueous solution of an alkali metal hydroxide containing a solubility promoter for said mercaptans to produce treated hydrocarbon distillate and a foul aqueous solution containing absorbed mercaptans, and wherein said foul solution is regenerated by steam stripping and the resulting regenerated solution is returned further to extract mercaptans, the improvement comprising successively extracting said foul oil with at least two aqueous solutions of alkali metal hydroxide having progressively increasing solvent powers for mercaptans to produce as many foul solutions and a sweetened gasoline, and separately regenerating said foul solutions by steam stripping them in succession with the same stripping steam in the order of their decrease in solvent powers for mercaptans.

6. The process of claim 5 wherein said hydrocarbon oil is a gasoline distillate.

7. In a regenerative process wherein mercaptans are extracted from a sour hydrocarbon oil with an aqueous solution of an alkali metal hydroxide containing a solubility promoter for said mercaptans and to produce a treated hydrocarbon distillate and a foul aqueous solution containing absorbed mercaptans, and wherein said foul solution is regenerated by steam stripping and the resulting regenerated solution is returned further to extract mercaptans, the improvement comprising extracting said oil with a first aqueous solution of an alkali metal hydroxide having a solvent power for mercaptans insufficient to effect sweetening, to produce a partially extracted oil and a first foul solution containing a portion of the mercaptans, further extracting said partially extracted oil with a second aqueous solution of an alkali metal hydroxide having a solvent power for mercaptans sufficient to sweeten said oil under the conditions of the extraction, to produce a sweetened oil and a second foul solution, and separately regenerating the two aqueous foul solutions by steam stripping them in succession with the same stripping steam in order of their decrease in solvent powers for mercaptans.

8. In a regenerative process wherein mercaptans are extracted from a sour hydrocarbon oil with an aqueous solution of an alkali metal hydroxide containing a solubility promoter for said mercaptans and to produce treated hydrocarbon distillate and a foul aqueous solution containing absorbed mercaptans, and wherein said foul solution is regenerated by steam stripping and the resulting regenerated solution is returned further to extract mercaptans, the improvement comprising extracting said oil with a first solution of an alkali metal hydroxide substantially free of a solubility promoter for mercaptans to produce a first foul solution, further extracting the resulting oil with a second aqueous solution of an alkali metal hydroxide containing a solubility promoter for mercaptans and having a solvent power for mercaptans sufficient to sweeten said oil under the conditions of the extraction to produce a sweetened oil and a second aqueous foul solution, and separately regenerating the two foul solutions by passing the same stripping steam successively first through the second, and then through the first solution.

ALBERT V. CASELLI.
ALAN C. NIXON.